July 13, 1926. 1,592,799
E. P. WEBSTER
OVEN AND DRIER
Filed June 4, 1925 2 Sheets-Sheet 1

INVENTOR
E. P. Webster
BY
E.W. Anderson
ATTORNEY

July 13, 1926.

E. P. WEBSTER

OVEN AND DRIER

Filed June 4, 1925

1,592,799

2 Sheets-Sheet 2

Inventor
E. P. Webster
E. W. Anderson Jr.
By
Attorneys

Patented July 13, 1926.

1,592,799

UNITED STATES PATENT OFFICE.

EARL P. WEBSTER, OF NIAGARA FALLS, NEW YORK, ASSIGNOR TO THE SHREDDED WHEAT COMPANY, OF NIAGARA FALLS, NEW YORK, A CORPORATION OF NEW YORK.

OVEN AND DRIER.

Application filed June 4, 1925. Serial No. 34,899.

This invention relates to ovens for baking food products and has to do more particularly with an oven arranged and constructed so that it may be used continuously for baking purposes, the products to be baked being moved continuously through the oven on a conveyor, so that unbaked products are continuously introduced into the oven as the baked products are withdrawn. This oven is further constructed to include a drying chamber through which the baked articles are passed so that the moisture retained in certain food products even after the baking operation, may be driven off therefrom and the products discharged from the oven in a condition such that they may be at once packed.

The present invention is particularly adapted for use in the manufacture of cereal products, such as shredded wheat biscuits, and an embodiment of the invention suitable for the baking of such products will be described. These biscuits upon their entrance into the oven contain large quantities of moisture which is not entirely driven off during the time that the biscuits are subjected to the baking heat. Accordingly, the biscuits must thereafter be subjected to a drying action, and the oven includes successive compartments through which the biscuits are carried, varying temperatures being maintained in these compartments, depending on the treatment which the biscuits are to be given in them. The oven is also provided with means by which a continuous draft of air may be drawn through the several compartments so as to remove the moisture.

Figure 1:
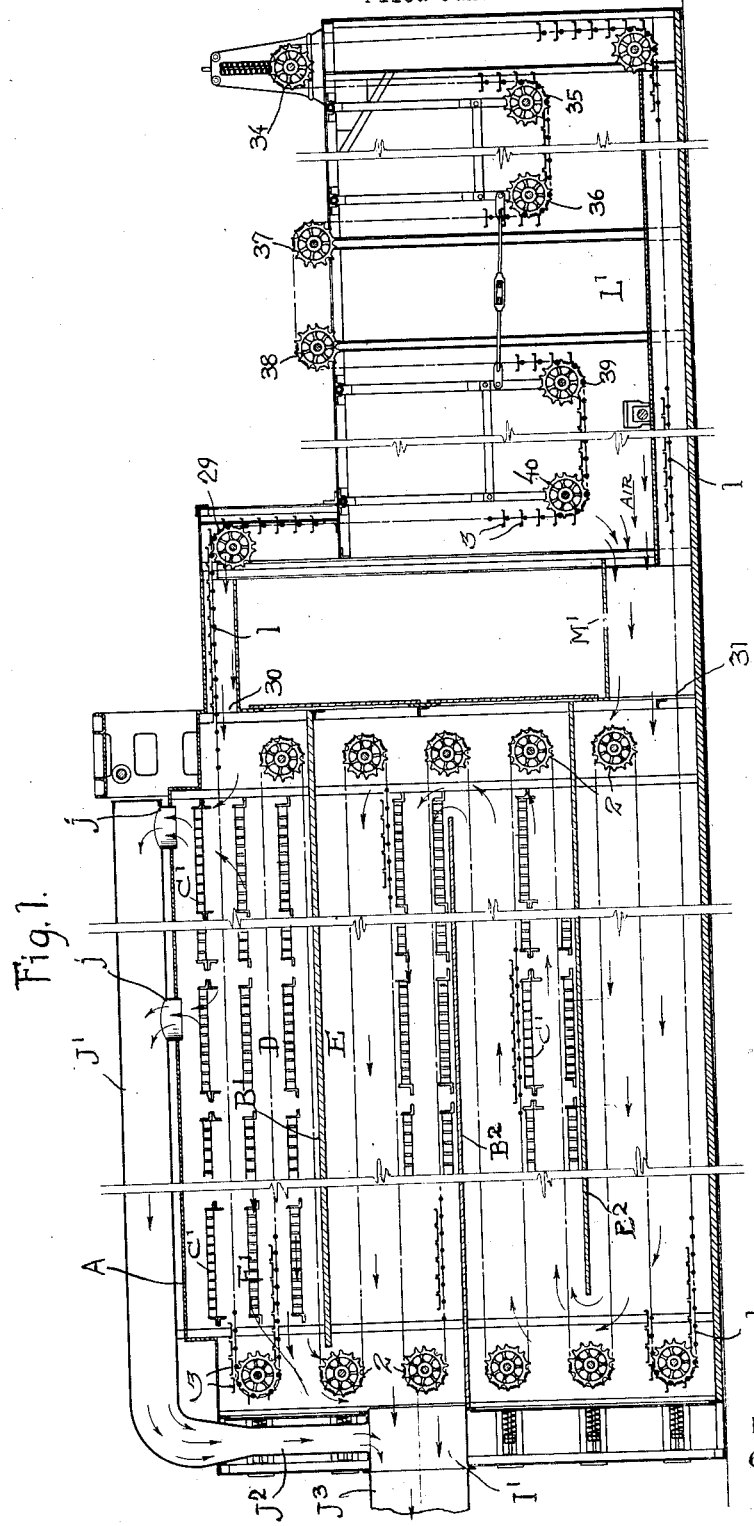
Figure 2:
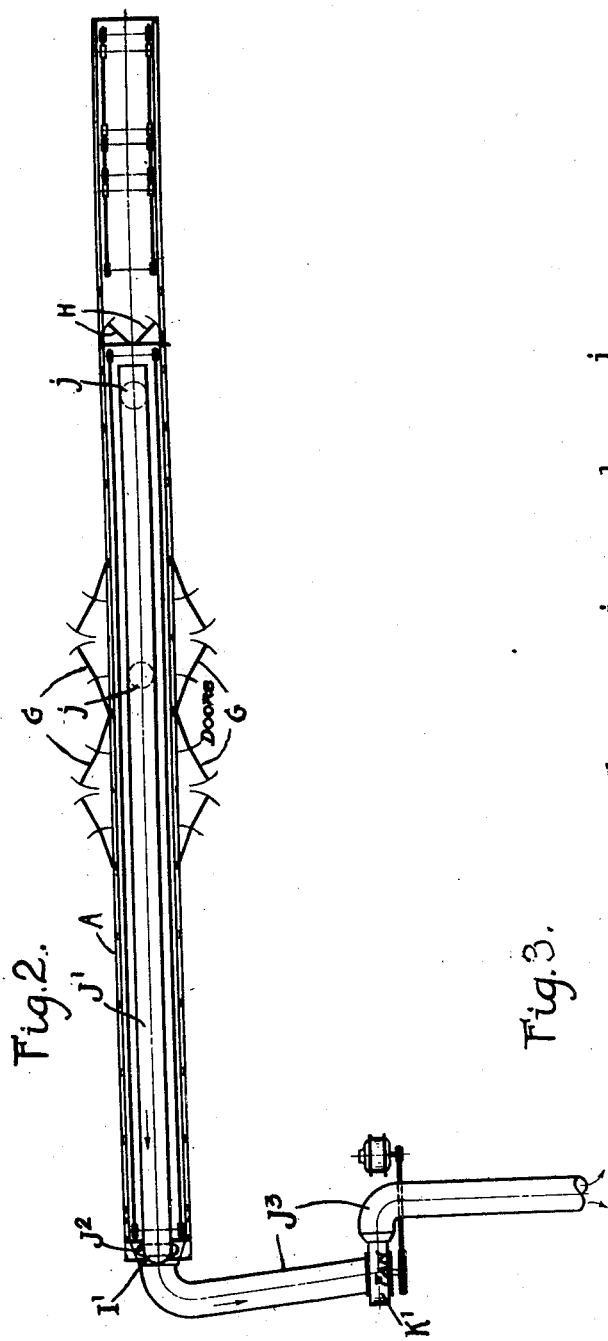
Figure 3:
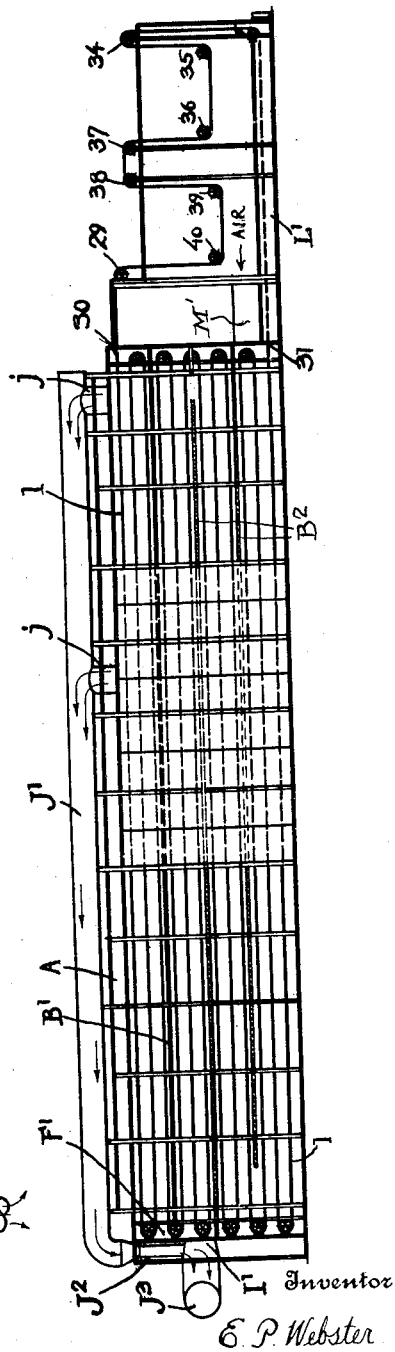

In the accompanying drawings, showing one embodiment of the invention,

Fig. 1 is a side view of the oven and associated devices shown partly in section and with certain parts broken away, Fig. 2 is a plan view of the mechanism, and Fig. 3 is another side view, largely diagrammatic, and on a reduced scale.

Referring now to the drawings, the oven enclosure or casing is designated A, and within the enclosure is a horizontal partition B', which divides the oven space into an upper shallow chamber and a lower chamber which is comparatively deep. Both chambers are heated by suitable means, in this case shown as electric heating units C', which are arranged in the chamber so as to maintain a higher temperature in the oven than in the lower chamber.

The biscuit are conveyed first through the upper chamber D, and thereafter through the lower chamber E by an endless conveyor chain 1, having a plurality of horizontal stretches and passing over end sprocket wheels 2; and 3 are the trays or pans of said conveyor, whereon the green biscuit are deposited previously to entry into the baking chamber, the conveyor chain 1 having a length in and a path through the lower or drying chamber at least twice its length in and path through the upper or baking chamber.

The biscuit deposited upon the conveyor 1 are passed thereby upwardly into the upper or "flash heat" baking chamber D at 30, and are conveyed back and forth longitudinally of said chamber sufficiently to cook and brown the biscuit.

The biscuit deposited upon the conveyor are caused to travel first continuously through the upper more highly heated portion of the upper chamber and then continuously through lower progressively less heated portions thereof, and thereafter at first continuously through the upper more highly heated portion of the lower chamber and then continuously through lower progressively less heated portions thereof. The oven and drier casing is provided with lateral doors G and with doors H at one end, and which may be opened for cooling purposes.

The biscuit having been carried by the conveyor 1 from the upper into the lower chamber, are passed along the latter longitudinally for a sufficient number of times back and forth to dry the biscuit or to evaporate therefrom the major part of the moisture content thereof not evaporated in the upper or baking chamber.

The baking of the biscuit in the upper or baking chamber is facilitated by drawing off the excess moisture therefrom at one end portion thereof as the biscuit enter, through openings $j$ to longitudinal conduit J', extending the full length of the oven, above the same, and communicating at the other end of the oven with vertical pipe $J^2$, discharging into lateral conduit $J^3$, communicating at I' with the lower or evaporating chamber and having a fan K' located therein and leading out of doors, to the outer air.

Air is sucked into said upper baking chamber D at the first-named end thereof at 30, where the conveyor 1 enters, and passes in part to said openings $j$ and in part traverses the full length of said upper chamber, through partition opening F' to the lateral conduit J³. One of the openings is placed close to the opening in the oven wall through which the conveyor enters, so that air is drawn into the oven through this opening and at once by-passed out of the oven into the conduit J. In this way a rapid current of air flows into the oven through the entrance opening at all times, and this prevents moisture-laden air from passing out of the oven through the opening. If the air were allowed to flow out through the opening 30, condensation of the moisture upon the conveyor devices and other associated parts would quickly take place. The lower or drying chamber is provided with two baffles B², so that the air admitted at one end thereof at M' must travel the full length of the oven three times before it finds an exit at J³. In this way a good circulation of air is provided for in both the upper and the lower chambers of the oven and drier, and excess moisture is taken off.

The conveyor carrying the baked and dried biscuit upon the trays 3 thereof emerges from the lower or evaporating chamber at 31 and thence passes horizontally through lower horizontal conduit L', which incloses the lower stretch of the conveyor at this end, the latter thence passing upwardly and around the sprocket wheels 34, 35, 36, 37, 38, 39, 40 and 29 before entering the upper chamber of the oven, a valve being preferably provided at the free end of said conduit L'.

The conveyor chain is made up of twelve stretches, each stretch being about sixty feet in length in the oven and drier casing, this great length of chain conveyor being necessary to admit of the requisite continuity of the baking and drying process in attaining the objects stated.

The conveyor 1 has the transverse trays 3 thereof adapted to each carry a transverse row of biscuit, the rows of biscuit being successively deposited upon said trays and successively removed therefrom by means not claimed herein. The conveyor is driven by suitable means which forms no part of the present invention.

The partition B dividing the upper baking chamber from the lower or evaporating chamber is insulated or of nonheat conducting nature so that the higher temperature of the baking chamber and the lower temperature of the drying or evaporating chamber will be preserved. The baffles B² of the evaporating chamber are not insulated and do not interfere with the general temperature of the chamber as a whole as stated.

I claim:

1. In an oven and drier, a casing provided near the top thereof with a horizonal partition dividing the same into an upper shallow baking chamber and a lower comparatively deep drying chamber, means for heating the upper chamber to a baking degree and the lower chamber to a lesser degree, an endless conveyor having a plurality of horizontal stretches in the upper and lower chambers, and means for taking off excess moisture from one of said chambers and for causing a draft of air from one end to the other end of one of said chambers and out of the casing.

2. In an oven and drier, a casing provided near the top thereof with a horizontal partition dividing the same into an upper shallow baking chamber and a lower comparatively deep drying chamber, means for heating the upper chamber to a baking degree and the lower chamber to a lesser degree, an endless conveyor having a plurality of horizontal stretches in the upper and lower chambers, and means for taking off excess moisture from one of said chambers and for causing a draft of air from one end to the other end of the other of said chambers and out of the casing.

3. In an oven and drier, a casing provided near the top thereof with a horizontal partition dividing the same into an upper shallow baking chamber and a lower comparatively deep drying chamber, means for heating the upper chamber to a baking degree and the lower chamber to a lesser degree, an endless conveyor having a plurality of horizontal stretches in the upper and lower chambers, and means for taking off excess moisture from the upper entrance portion of the upper chamber and for causing a draft of air from one end to the other end of both of said chambers and out of the casing.

4. In an oven and drier, a horizontally elongated casing provided near the top thereof with a horizontal partition dividing the same into an upper shallow baking chamber and a lower comparatively deep drying chamber, means for heating the upper chamber to a baking degree and the lower chamber to a leeser degree, an endless conveyor having a plurality of horizontal stretches and adapted to convey biscuit at first continuously through the more highly heated portion of the upper chamber and then continuously through lower progressively less heated portions thereof and thereafter at first continuously through the more highly heated portion of the lower chamber and then continuously through lower progressively less heated portions thereof, and means for taking off excess moisture from the upper chamber and for causing a draft of air from one end of one of said chambers to the other end thereof and out of the casing.

5. In an oven and drier, a horizontally elongated casing provided near the top thereof with a horizontal partition dividing the same into an upper shallow baking chamber and a lower comparatively deep drying chamber, means for heating the upper chamber to a baking degree and the lower chamber to a lesser degree, an endless conveyor having a plurality of horizontal stretches and adapted to convey biscuit at first continuously through the more highly heated portion of the upper chamber and then continuously through lower progressively less heated portions thereof and thereafter at first continuously through the more highly heated portion of the lower chamber and then continuously through lower progressively less heated portions thereof, and means for taking off excess moisture from the upper chamber and for causing a draft of air from one end of each chamber to the other end thereof and out of the casing.

6. In apparatus for manufacturing food products, the combination of an oven, an endless conveyor extending through the oven, an air admission opening in one wall of the oven, an air exhaust opening in another wall, suction means connected with the exhaust opening for drawing air through the oven, and a conduit connected to the suction means and leading to a point adjacent the opening through which the conveyor enters the oven, this conduit providing a by-pass for air from the conveyor entrance opening to the suction means.

7. In apparatus for manufacturing food products, the combination of an oven, an endless conveyor extending through the oven, a portion of the conveyor returning upon itself a plurality of times to form open loops, a partition within the oven dividing it into two chambers through which the conveyor passes successively, an opening for the admission of air into the chamber from which the conveyor passes out of the oven, an air exhaust opening, suction means connected with this exhaust opening, an air outlet opening in the wall of the chamber into which the conveyor enters at a point adjacent the conveyor entrance opening, and a conduit connecting this air outlet opening with the air suction means whereby a current of air is drawn inwardly through the conveyor entrance opening and moisture is withdrawn from the oven.

8. In apparatus for manufacturing food products, the combination of an oven, an endless conveyor extending through the oven, a horizontal partition within the oven dividing the same into chambers through which the conveyor passes successively, means for heating the chamber into which the conveyor enters to a relatively high temperature, means for heating the second chamber to a relatively lower temperature, and means for continuously passing air through the oven, the air being drawn in from the atmosphere and after passage through the oven, discharged into the atmosphere.

9. In apparatus for manufacturing food products, the combination of an oven, an endless conveyor extending through the oven in a plurality of stretches, means for maintaining a draft of air through the oven, a portion of the air entering through the opening through which the conveyor enters the oven, and means for withdrawing air from the oven at a point adjacent the conveyor entrance opening.

10. In apparatus for manufacturing food products, the combination of an oven, an endless conveyor extending through the oven in a plurality of stretches, air inlet openings in one wall of the chamber, an air exhaust opening in another wall, draft means connected with the exhaust opening for drawing air continuously through the oven, and an air outlet opening in the wall of the oven at a point near the opening through which the conveyor enters the oven, this outlet opening being connected to the draft means whereby air entering the oven through the conveyor entrance opening is drawn immediately out of the oven.

In testimony whereof I affix my signature.

EARL P. WEBSTER.